United States Patent [19]
Brummer

[11] Patent Number: 5,762,354
[45] Date of Patent: Jun. 9, 1998

[54] CYCLE REAR SUSPENSION SYSTEM

[76] Inventor: Timothy E. Brummer, 1308 Willow Ave., Lompoc, Calif. 93436

[21] Appl. No.: 600,236

[22] Filed: Feb. 12, 1996

[51] Int. Cl.⁶ ................................................ B62K 25/20
[52] U.S. Cl. ......................................... 280/284; 280/285
[58] Field of Search ............................... 280/275, 281.1, 280/283, 284, 285, 286, 288.3

[56] References Cited

U.S. PATENT DOCUMENTS

| 4,856,801 | 8/1989 | Hollingsworth | 280/284 |
| 5,072,961 | 12/1991 | Huppe | 280/284 X |

FOREIGN PATENT DOCUMENTS

| 2673906 | 9/1992 | France | 280/284 |
| 251668 | 1/1926 | Italy | 280/284 |

*Primary Examiner*—Victor E. Johnson

[57] ABSTRACT

A rear suspension system for a bicycle or a tricycle having a main frame which includes rear wheel chain stays. Two or more swing arms, one for each chain stay, are pivotally mounted to the chain stays, with the front of the swing arms extending into the interior of the chain stays. The rear wheel or wheels (in the case of a tricycle), are rigidly attached to the end of these swing arms. An elastic member is interposed between the front end of each swing arm and the interior of each chain stay. This elastic member is preferably urethane rubber or a similar material placed in compression by being positioned underneath the front of the swing arm. When the cycle encounters a bump or road irregularity, the rear of the swing arms move upward, causing the front of the swing arms to pivot downward, increasing the loading on the elastic member and at the same time absorbing the shock from the road irregularity before it is transferred to the bicycle frame and rider.

3 Claims, 3 Drawing Sheets

CYCLE REAR SUSPENSION SYSTEM

FIELD OF THE INVENTION

The present invention is in the field of bicycles and tricycles, and more particularly relates to cycles employing suspension means for at least the rear wheel.

BACKGROUND OF THE INVENTION

Bicycles have been used as a means of transportation and recreation for well over one century. However, almost all of the bicycles produced prior to 1990 had a relatively rigid frame, which transmits impacts, due to uneven surfaces, directly to the rider. In the past, riders and manufacturers have resisted the added weight, cost, complexity, and odd appearance of bicycles equipped with shock absorbing suspensions.

However, the recent popularity of off road mountain bikes has stimulated the market for bicycles incorporating front and rear suspension mechanisms. These fully suspended bicycles, when used on rough off road trails, have been demonstrated to be faster, safer, and more comfortable than a bicycle having a rigid frame. Fully suspended bicycles additionally have demonstrated these same advantages on poorly maintained, broken paved roadways.

Unfortunately, all designs currently in use also exhibit one or more of the following drawbacks: significantly more weight, a reduction in frame rigidity, numerous moving parts which wear out, increased cost, a reduction in the riders pedalling energy available for forward motion, inability to use a rear rack, exposure to damaging environmental effects and impacts, and non traditional, unsightly styling and looks.

SUMMARY OF THE INVENTION

The present invention is an improved cycle suspension device. The device is an improvement over existing cycle rear suspension systems by virtue of being lightweight, simple, and configured to maximize conversion of the riders pedalling energy into forward motion. This novel device is also more aesthetically appealing than present suspension devices because most of the mechanism is housed inside of the bicycle frame tubes.

Additional advantages are gained due to the chain stays of the present invention, which are a portion of the bicycle frame and support the suspension device, are in substantially the same position as on a rigid bicycle frame. Because of this, the seat stays as normally employed on a rigid bicycle frame can also be deployed substantially in their normal position. This arrangement has the advantage of; A) increasing frame stiffness and strength for the least amount of weight, B) permitting the attachment of a substantially normal rear rack in the normal position, and C) results in a much more traditional look and style to the bicycle.

The suspension device comprises two pivoting swing arms, one on either side of the rear wheel. These swing arms are preferably less than 12 inches long, with a pivot point substantially in the middle. The rear wheel axle attaches to the rear of the swing arms, while the front ends acts upon elastic members or springs, at least one for each swing arm. Additionally, the pivot points and elastic members are supported and substantially enclosed by the rear wheel chain stays of the bicycle frame. These chain stays are in approximately the same position, but somewhat shorter and of larger diameter, than the chain stays on a rigid, non suspended bicycle frame.

In the preferred embodiment, any upward load applied the rear wheel causes the swing arms to pivot about the pivot point, this in turn causes the elastic members to compress. The rear wheel axle, which is rigidly affixed to the rear of both swing arms, prevents each swing arm from acting independently, therefore both swing arms act on their respective elastic members in a uniform manner. Enclosing the pivot points and elastic members inside of the chain stays advantageously allows the mechanism to be sealed up, thus preventing the entry of any dirt and water, and also any impact damage.

It should also be noted that the present invention can be easily employed on tricycles having either one or two rear wheels, as well as to bicycles.

The novel features which are believed to be characteristic of the invention, both as to organization and method of operation, together with further objects and advantages thereof, will be better understood from the following description of the accompanying drawings of the preferred embodiment of the invention. It is to be expressly understood, however, that the drawings are for the purpose of illustration and description only, and are not intended as a definition of the limits of the invention.

DETAILED DESCRIPTION OF THE PREFERRED EMBODIMENT

Figure 1:
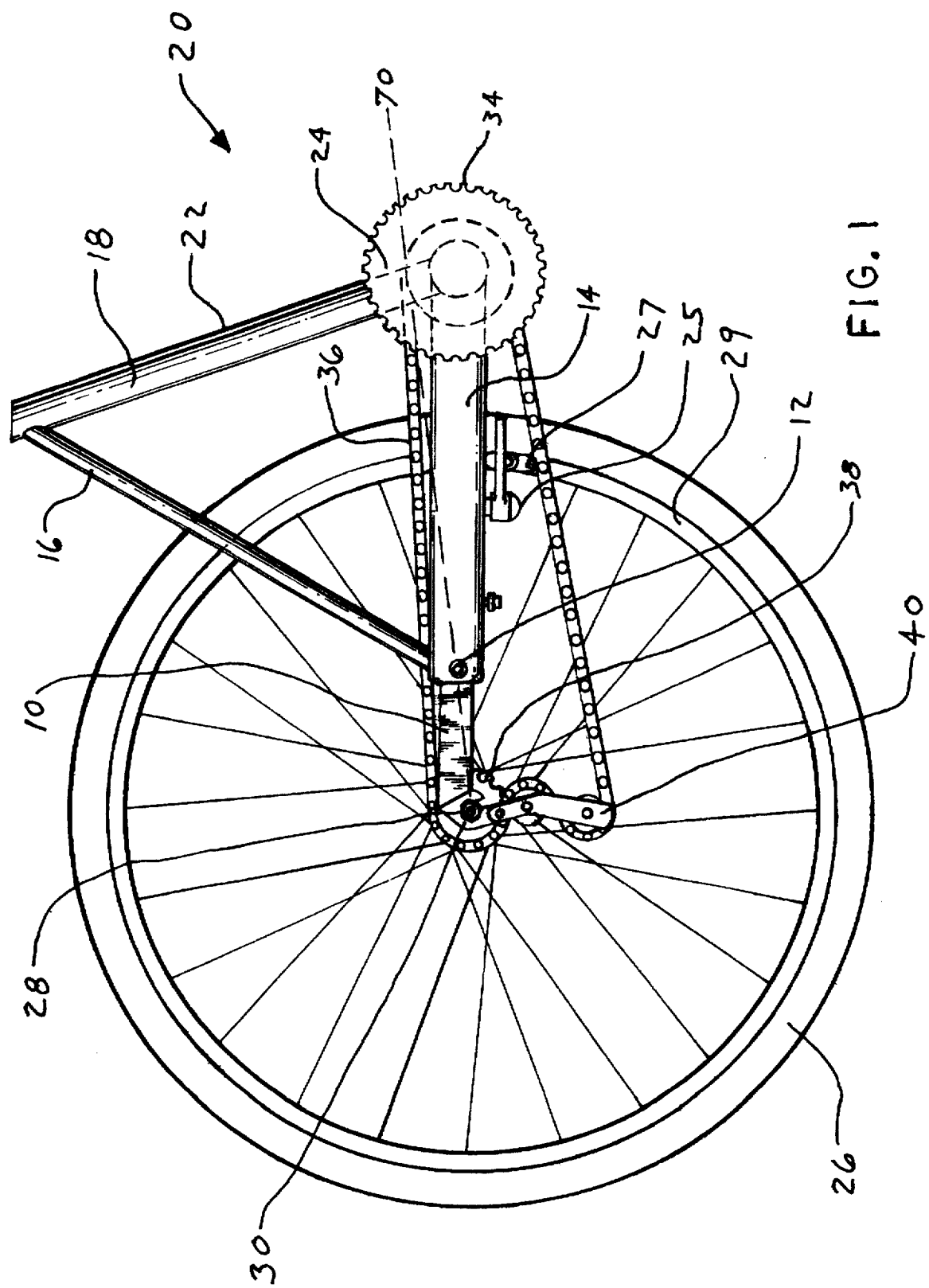
FIG. 1 is a right side elevation view of the rear section of a bicycle incorporating the present suspension system invention, illustrating a preferred form.

Referring to FIG. 1, the bicycle 20 has a frame 22 partially consisting of a pair of chain stays 14, a pair of seat stays 16, and a seat tube 18. The main element of the suspension system are the swing arms 10. There are two swing arms, only one being visible in the drawing. The swing arms are in a 1 g load position. A 1 g load position is the load resulting from a rider sitting on the bicycle, with no bump impact loading. The swing arms are connected to the bicycle frame 22 at the pivot points 12.

It should be noted that the bicycle frame 22 is configured substantially the same as a traditional diamond type bicycle frame. The bicycle 20 additionally incorporates a chain-gear drive system 24, and rear wheel 26. The rear wheel furthermore has an axle 28 with attaching means 30, whereby the axle can be firmly and rigidly affixed to the swing arms 10, and a rim 29. The chain-gear drive system 24 is comprised of a forward set of sprockets 34, the chain 36, a rear set of cogs 38, and a rear derailleur 40.

A rear brake 25 can be seen positioned in substantially the normal position. This type of rim brake can be used if the rear suspension system vertical travel is less than 50 mm. If the travel is more than this, then the rear wheel would move so far that there would not be adequate contact area between the brake pads 27 and wheel rim 29; in this case a hub type of brake would have to be used.

It can be seen on FIG. 1 that a line 70 which passes through the centers of the pivot point 12 and rear axle 28 also passes through the point where the chain 36 meets the top of the smallest of the forward sprockets 34. This alignment assures that there will be no motion of the rear suspension due to chain tension, at least while the chain is in the smallest forward sprocket. If the chain is in a larger forward sprocket, then a very small amount of motion may occur due to chain tension. The chain tension mentioned above would obviously be caused by a bicycle rider applying force to the pedals.

It should also be noted that, if it is desired to have different motion characteristics of the rear suspension, the rear axle 28 and/or pivot point 12 can be moved up or down during design and construction of the bicycle, thereby achieving the desired motion.

As can be also be seen in FIG. 1, the novel arrangement of the components of the suspension system has resulted in a very clean, traditional style and look to the bicycle.

Figure 2:
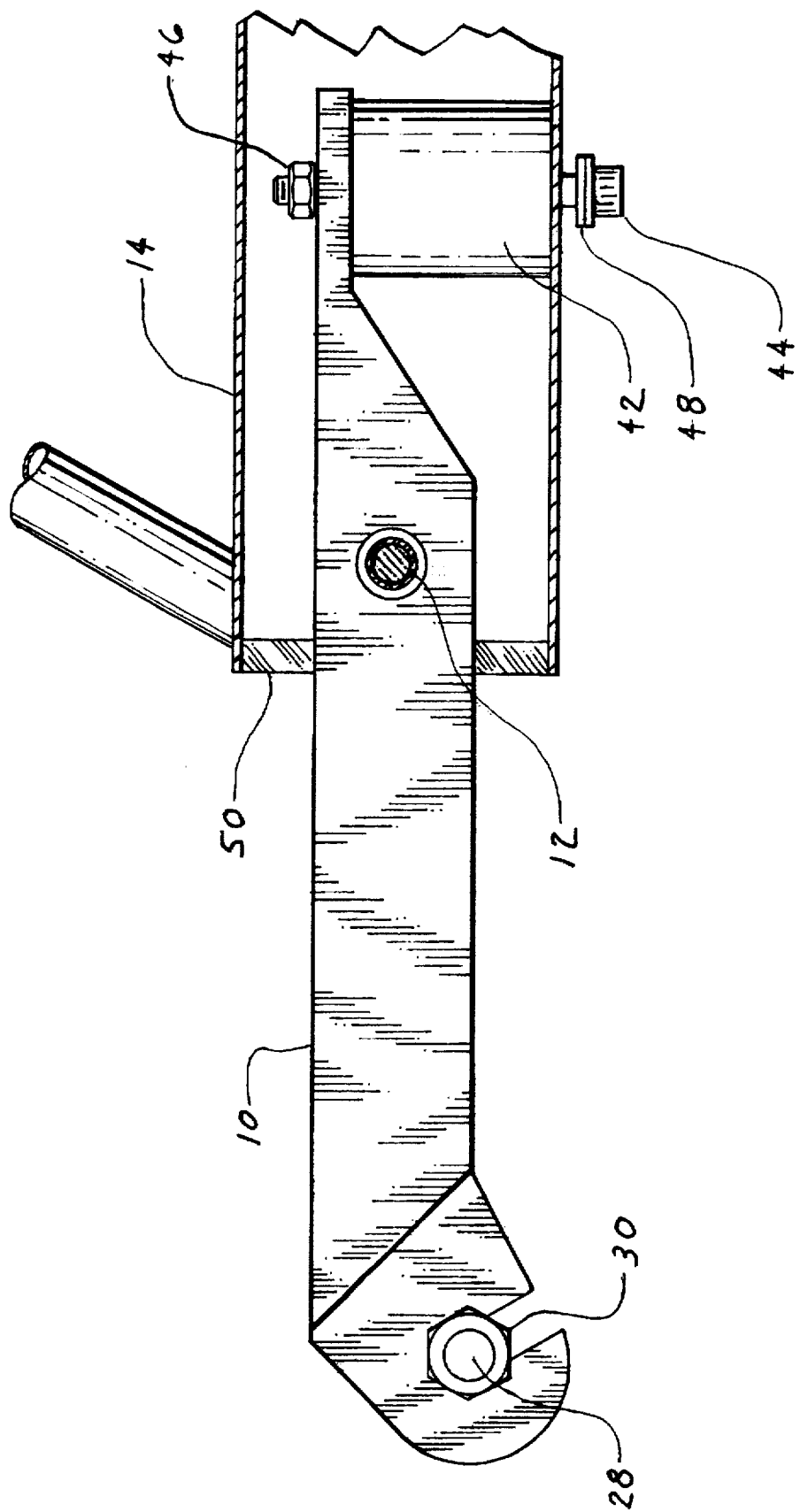
FIG. 2 is an enlarged view of FIG. 1, showing in more detail the suspension mechanism, including the parts inside of the chain stay.

The actual operation of the suspension system components, where it absorbs the shock caused by bumps or road irregularities, can be best seen in FIG. 2. When the rear wheel 26 is forced upwards by a bump, the rear axle 28 and also the rear of the swing arms 10 are forced upwards. Because the swing arms are free to pivot at the pivot point 12, the front of the swing arm is forced downwards. This downwards pressure is absorbed by the elastic member 42. In the preferred embodiment, this elastic member is placed in compression by the loads transferred from the swing arm, and is preferably made from an elastomeric type material, such as urethane rubber. However, other types of elastic members can also be employed, such as a pneumatic compressible member, a coil spring, or leaf springs.

It should be noted that the shock response characteristics of the system can be changed by varying the ratio of the axle—pivot distance to the pivot—elastic member distance. If this ratio is increased, the amount of vertical suspension travel will increase, additionally the loading on the elastic member will also increase. If the ratio is decreased, the opposite is true. The shock absorption characteristics of the assembly also depend upon the durometer of the elastic member.

Also seen in FIG. 2 is the preload adjuster bolt 44, and nut 46. The nut is held captive to the swing arm so it will not turn when the bolt is tightened, and also is a self-locking type nut. The preload bolt can be adjusted to regulate the amount of downward suspension travel desired; for instance when a pot hole is encountered by the rear wheel, and as the rear wheel drops into the pothole, the loading on the rear wheel drops below 1 g. A small bumper 48, preferably made of rubber, is provided to limit the impact force the bolt head may impart to the chain stay when the travel limit is reached. A space can be noted between the bumper 48 and chain stay 14, because the swing arms are shown in the 1 g loading condition. This preload bolt mechanism also prevents the top of the swing arm 10 from contacting the inside of the seat stay 14, when the loading drops toward 0 g.

Another feature of the present invention is the seal 50. This seal is preferably made of rubber, and by virtue of it's placement between the swing arm 10 and the chain stay 14, prevents the entry of dirt, water, and foreign objects into the chain stay and suspension mechanism.

Figure 3:
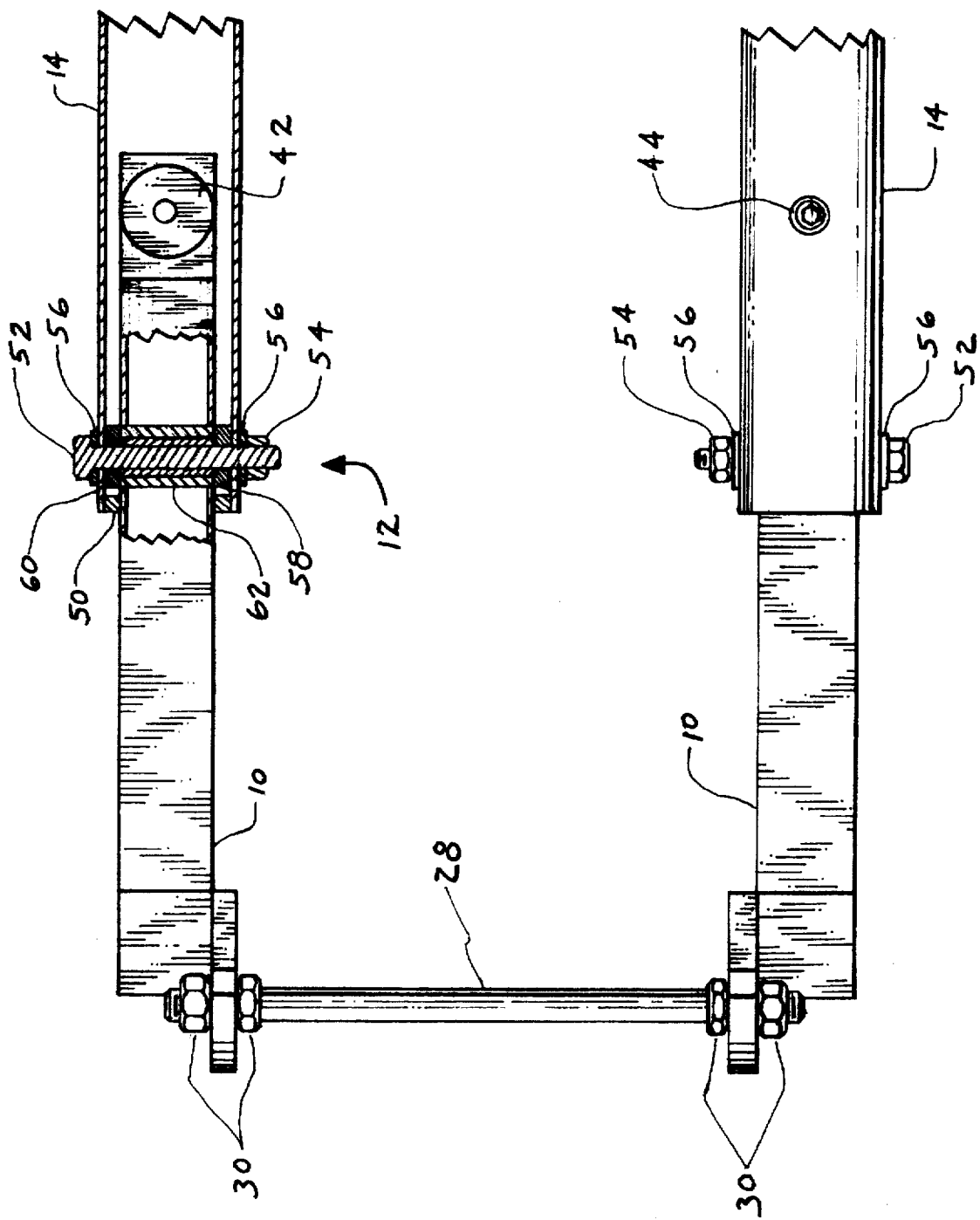
FIG. 3 is bottom plan view of the rear suspension system of FIG. 1, showing the swing arm to chain stay pivoting attachment in greater detail.

FIG. 3 provides further detail into the operation and configuration of the suspension system. Most notable is the rear axle 28 connecting the swing arms 10. This axle is the only member preventing the two swing arms from acting independently. Therefore, the axle must be sufficiently rigid to prevent excessive deflections, when side loads are applied to the rear wheel. It must also be made strong enough so as to not break when said side loads are applied. The attaching means 30 also need to be made strong enough so as to keep the axle safely attached to the swings arms under said side loads.

A cutaway detail of one pivot point 12 can also be seen. The pivot point includes a pivot bolt 52, nut 54, washers 56, bushing 58, and spacers 60. The pivot bolt mounts into holes drilled into the chain stay 14, passes through the spacers 60, and supports the bushing 58. The pivot bolt cannot be fully tightened, otherwise, the swing arm would not pivot freely. Therefore, the nut 54 is of a self locking type, preventing it from coming loose even though it is not fully tightened. The bushing 58 is pressed into a boss 62, which in turn is affixed to the swing arm 10, preferably by welding or brazing.

Additionally, the positioning of the elastic member 42, and location of the preload bolt 44, is made more clear by FIG. 3.

The foregoing detailed description is illustrative of one embodiment of the invention, and it is to be understood that additional embodiments thereof will be obvious to those skilled in the art, the embodiments described herein together with those additional embodiments are considered within the scope of the invention.

What is claimed is:

1. A suspension assembly adapted for attaching an axle of a wheel to a frame of a bicycle, the suspension assembly comprising:

a) at least one hollow chain stay tube, each said chain stay tube having a substantially cylindrical wall and an open end;

b) an elongate rigid swing arm having one end adapted for rigid and releasable attachment to said axle and an opposing free end extending within said open end of each said chain stay tube and a pivot mount disposed therebetween;

c) a pivotable connecting means operable for rotatably attaching said pivot mount on said swing arm to each said chain stay tube; and d) an elastically deformable bushing disposed adjacent said free end of said swing arm, said elastically deformable bushing providing, in operation, a restoring force responsive to compression thereof by relative movement between said free end of said swing arm and said wall of each said chain stay tube when said swing arm is pivotally attached thereto.

2. A bicycle comprising:

a) a unitary frame comprising at least one hollow chain stay tube, each said chain stay tube having a substantially cylindrical wall and an open end;

b) an elongate rigid swing arm having one end adapted for rigid and releasable attachment to a rear wheel axle and an opposing free end extending within said open end of each said chain stay tube and a pivot mount disposed therebetween;

c) a pivotable connecting means operable for rotatably attaching said pivot mount on said swing arm to each said chain stay tube; and d) an elastically deformable bushing disposed adjacent said free end of said swing arm, said elastically deformable bushing providing, in operation, a restoring force responsive to compression thereof by relative movement between said free end of said swing arm and said wall of each said chain stay tube when said swing arm is pivotally attached thereto.

3. A tricycle comprising:
   a) a unitary frame comprising at least one hollow chain stay tube, each said chain stay tube having a substantially cylindrical wall and an open end;
   b) an elongate rigid swing arm having one end adapted for rigid and releasable attachment to a rear wheel axle and an opposing free end extending within said open end of each said chain stay tube and a pivot mount disposed therebetween;
   c) a pivotable connecting means operable for rotatably attaching said pivot mount on said swing arm to each said chain stay tube; and
   d) an elastically deformable bushing disposed adjacent said free end of said swing arm, said elastically deformable bushing providing, in operation, a restoring force responsive to compression thereof by relative movement between said free end of said swing arm and said wall of each said chain stay tube when said swing arm is pivotally attached thereto.

* * * * *